H. J. WYATT.
COMBINED BORING MACHINE AND LATHE.
APPLICATION FILED DEC. 30, 1911.
1,096,881.
Patented May 19, 1914.
4 SHEETS—SHEET 4.
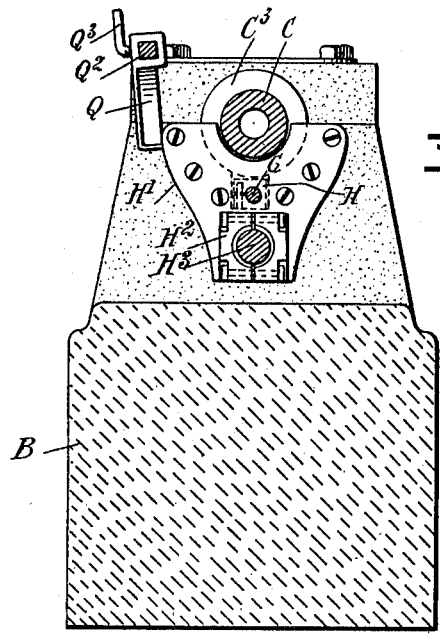
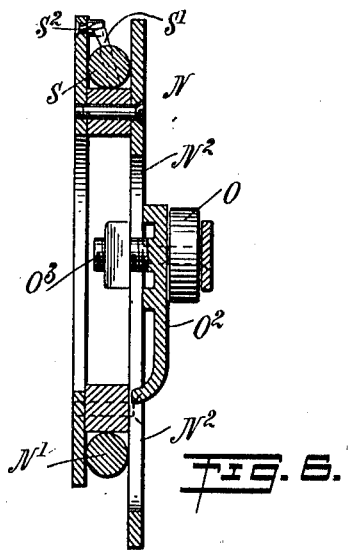
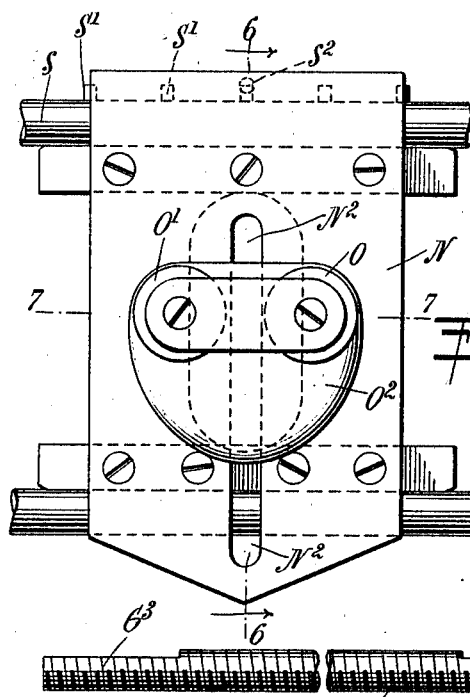
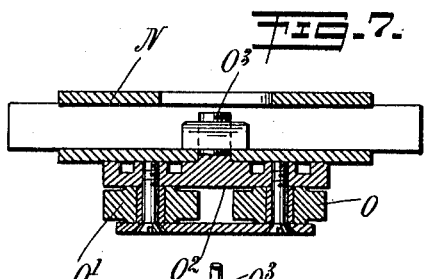
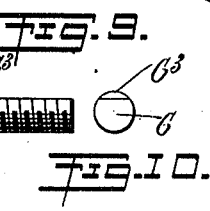
WITNESSES
G. Robert Thomas
INVENTOR
Herbert J. Wyatt
BY
ATTORNEYS

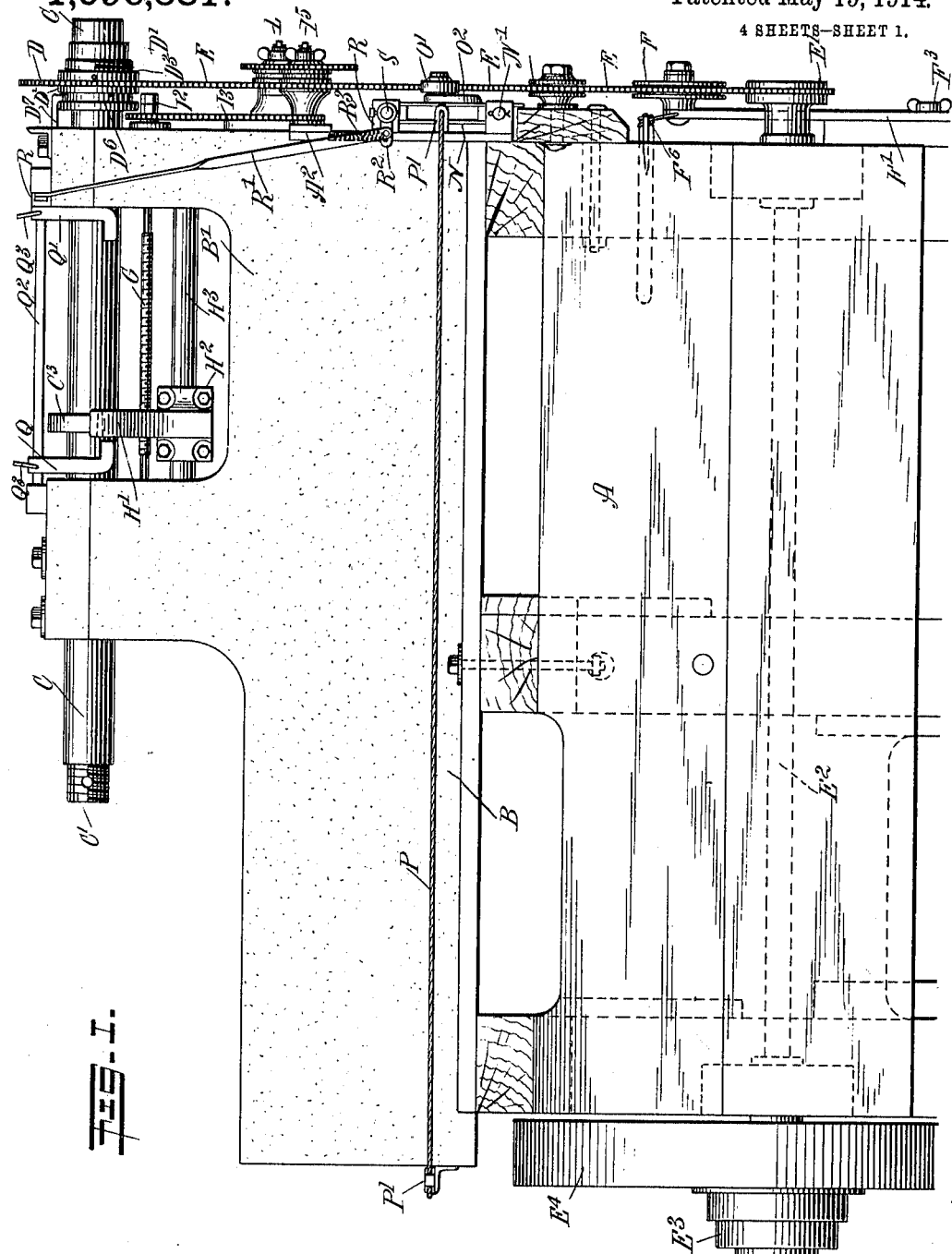

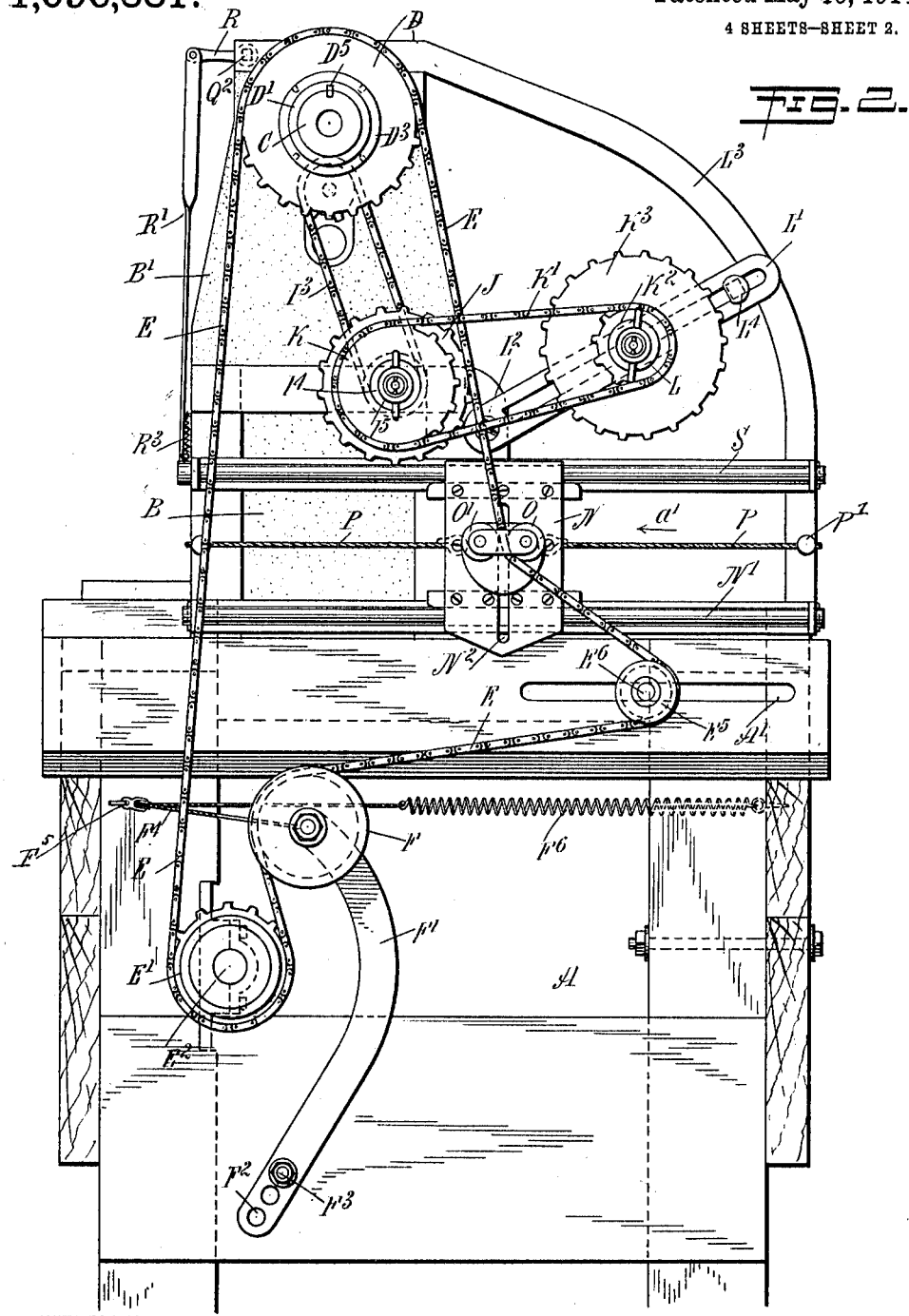

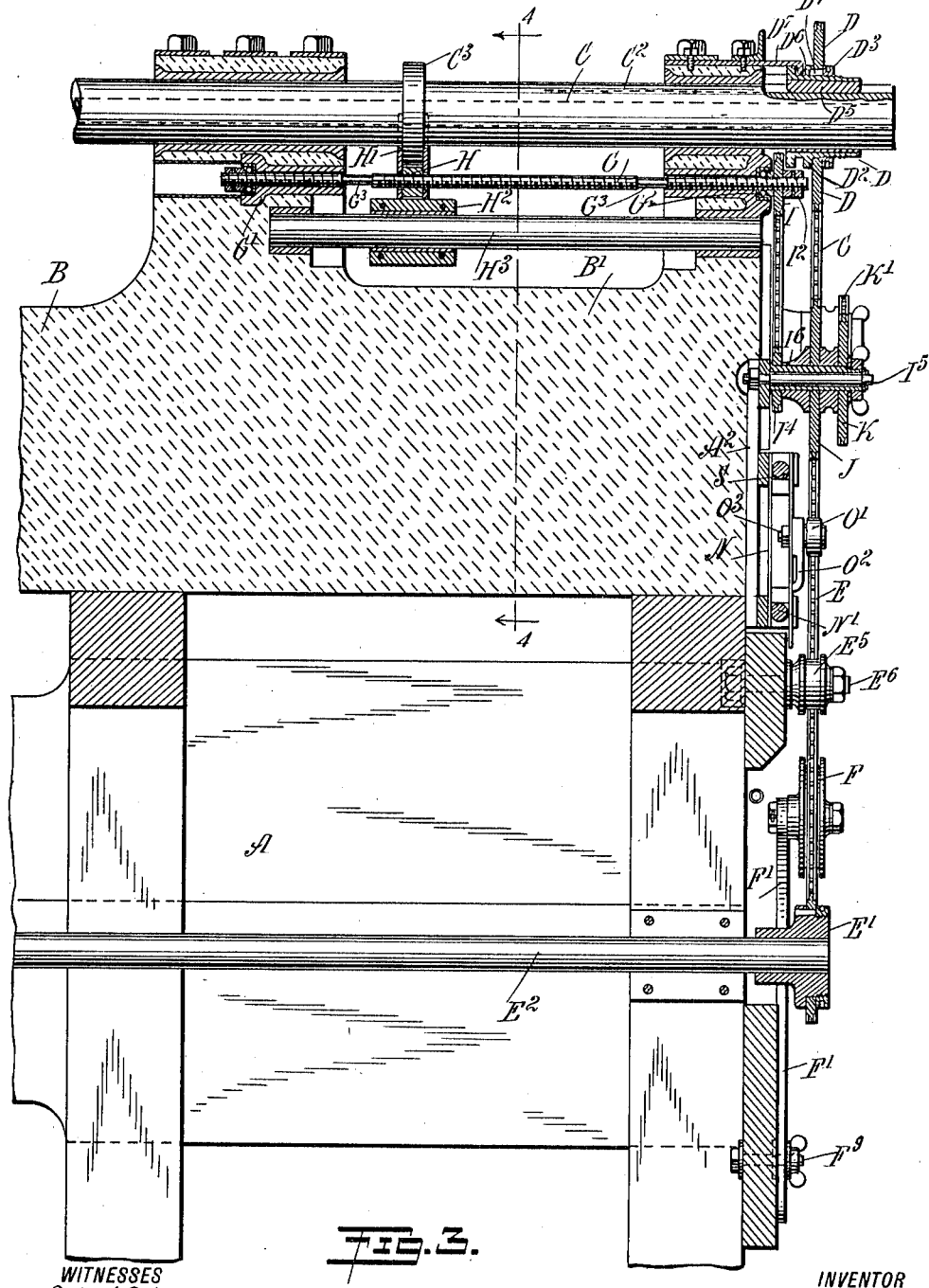

UNITED STATES PATENT OFFICE.

HERBERT JAMES WYATT, OF LONGBRANCH, WASHINGTON.

COMBINED BORING-MACHINE AND LATHE.

1,096,881.   Specification of Letters Patent.   Patented May 19, 1914.

Application filed December 30, 1911. Serial No. 668,674.

*To all whom it may concern:*

Be it known that I, HERBERT J. WYATT, a citizen of the United States, and a resident of Longbranch, in the county of Pierce and State of Washington, have invented a new and Improved Combined Boring - Machine and Lathe, of which the following is a full, clear, and exact description.

The object of the invention is to provide a new and improved boring machine and lathe, arranged to permit its convenient use for boring or turning purposes, the machine being provided with a spindle capable of receiving a boring tool or a face plate, and the spindle being mounted to turn and to slide in the direction of its axis.

In order to impart a rotary motion to the spindle, use is made of a sprocket chain drive, which is also capable of driving the feed mechanism employed for moving the spindle in the direction of its axis.

A practical embodiment of the invention is represented in the accompanying drawings forming a part of this specification, in which similar characters of reference indicate corresponding parts in all the views.

Figure 1 is a side elevation of a combined boring machine and lathe; Fig. 2 is an elevation of the right-hand end of the combined boring machine and lathe; Fig. 3 is an enlarged longitudinal central section of the same; Fig. 4 is an enlarged cross section of the same on the line 4—4 of Fig. 3; Fig. 5 is an enlarged face view of the slide for the sprocket chain of the chain drive and part of the means for automatically actuating the slide; Fig. 6 is a cross section of the same on the line 6—6 of Fig. 5; Fig. 7 is a sectional plan view of the same on the line 7—7 of Fig. 5; Fig. 8 is a perspective view of one of the rock arms of the tripping device for reversing the longitudinal sliding movement of the spindle; Fig. 9 is an enlarged side elevation of the feed screw; Fig. 10 is an end view of the same; and Fig. 11 is an enlarged face view of the sprocket wheel for driving the feed screw.

On a suitably constructed framework A is mounted a bed plate B of reinforced concrete or other suitable material, and in the head stock B' and bed plate B is mounted to turn and slide in the direction of its axis a spindle C having a threaded end C' for the reception of a face plate, the spindle being preferably made hollow for the reception of a boring tool, fastened in place by a set screw or other fastening means. On the rear end of the spindle C is held a sprocket wheel D connected with the spindle C, so as to allow lengthwise movement of the spindle for rotating the spindle C when rotating the sprocket wheel D. The sprocket wheel D has its body removably mounted on the hub D' by abutting the body against a collar $D^2$ formed integrally on the hub D' and engaging the front face of the body by a collar $D^3$ screwing on the outer threaded end of the hub D'. A pin $D^4$ fixed in the collar $D^2$ engages the body of the sprocket wheel D to rigidly connect the body with its hub D'. By the arrangement described, the body of the sprocket wheel D can be readily removed from its hub D' and replaced by a larger or a smaller body according to the speed with which the spindle C is to be driven. A key $D^5$ held on the hub D' engages a key-way $C^2$ formed lengthwise on the spindle, and the hub D' is provided with an annular groove $D^6$ engaged by a bracket $D^7$ attached to one of the bearings of the head stock B', so that the sprocket wheel D is held against longitudinal movement but allows sliding of the spindle C in the direction of its length.

A sprocket chain E passes over the sprocket wheel D and around a sprocket wheel E' secured on a driving shaft $E^2$ journaled in suitable bearings arranged on the framework A. The driving shaft $E^2$ may be driven by motive power or by a stepped pulley $E^3$ connected by belt with other machinery for imparting a continuous rotary motion to the shaft $E^2$ which by the sprocket wheel E', sprocket chain E and sprocket wheel D rotates the spindle C. A fly wheel $E^4$ is also secured on the shaft $E^2$. The sprocket chain E passes around a guide pulley $E^5$ journaled on a stud $E^6$ held transversely adjustable in a horizontal slot A' formed in the framework A, and the sprocket chain E also passes around a tightening pulley F journaled in the free end of an arm F' provided at its opposite end with a series of apertures $F^2$, any one of which is engaged by a stud $F^3$ held on the framework A to allow the arm F' to swing. By the arrangement described the arm F' can be adjusted so as to bring the tightening pulley F in proper relation relative to the sprocket wheel E'. To the upper end of the arm F' is secured one end of a rope or chain $F^4$ passing around a guide pulley $F^5$ attached to the framework A, and the other end of the said rope $F^4$ is secured to one end of a spring $F^6$ attached at its other end to the framework A. By the arrangement described a pull is exerted on the arm $F'$ to cause the tightening pulley F to tighten the sprocket chain E and to allow bodily movement of the sprocket chain E for the purpose hereinafter more fully explained.

In order to move the spindle C forward and backward in the direction of its axis use is made of a feed screw G arranged parallel to the spindle C immediately below the same and removably journaled in suitable ball bearings $G'$, $G^2$ held in the head stock $B'$. The feed screw G imparts a traveling motion to a feed nut H in which screws the feed screw G, and the said feed nut H is provided with an upward extension $H'$ engaging a collar $C^3$ on the spindle C so that when the feed nut H is moved lengthwise on the feed screw G a like lengthwise movement is given to the spindle C. The feed nut H is provided with a downward extension $H^2$ slidingly engaging a guideway $H^3$ held on the head stock $B'$, thus guiding the feed nut H in its forward and backward movement on the feed screw G. The feed screw G also has unthreaded portions $G^3$ at the limits of movements of the feed nut H.

The feed screw G is driven in either direction from the sprocket chain E, and for this purpose the following arrangement is made: The ends of the feed screw G are provided with flattened portions $G^3$ (see Figs. 9 and 10) and can be placed in the bearings $G'$, $G^2$ with either end at the rear, and the rear flattened end is adapted to be engaged by the correspondingly shaped portion $I'$ of a sprocket wheel I (see Fig. 11), held in place on the spindle end by abutting against the bearing $G^2$ at one side and by nuts $I^2$ screwing on the feed screw G at the other side of the sprocket wheel I. Over the sprocket wheel I passes a chain $I^3$ also passing around a sprocket wheel $I^4$ mounted to rotate on a stud $I^5$ carried by a frame $A^2$ forming part of the framework A. On the hub $I^6$ of the sprocket wheel $I^4$ are removably secured sprocket wheels J and K, of which the sprocket wheel J is adapted to be engaged by the sprocket chain E for rotating the feed screw G in one direction. The sprocket wheel K is connected by a sprocket chain $K'$ with a sprocket wheel $K^2$ mounted to rotate loosely on a stud L held adjustable in a slotted arm $L'$ fulcrumed at $L^2$ on the frame $A^2$, and the arm $L'$ is adapted to be fastened at its free end to a fixed segment $L^3$ by the use of a suitable clamping screw or a bolt $L^4$. With the sprocket wheel $K^2$ rotates a sprocket wheel $K^3$ adapted to be engaged by the sprocket chain E so as to rotate the sprocket wheel $K^3$ in the reverse direction to the sprocket wheel J to drive the feed screw G in the opposite direction, it being understood that the rotary motion given to the sprocket wheel $K^3$ by the chain E is transmitted by the sprocket wheel $K^2$, sprocket chain $K'$ and the sprocket wheel K to the sprocket wheel $I^4$ connected with the feed screw G, as previously explained. It is also understood that the sprocket wheels I and $I^4$ can be easily removed to permit of giving additional change of speed to the feed screw G by the use of different sized sprocket wheels.

In order to impart a bodily movement to the chain E to engage the same with either sprocket wheel J or $K^3$, use is made of a slide N mounted to slide transversely on a suitable guideway $N'$ arranged on the frame $A^2$. On the slide N are mounted friction rollers O, $O'$ between which passes the sprocket chain E so that when the slide N is shifted transversely the sprocket chain E is moved in engagement either with the sprocket wheel J or with the sprocket wheel $K^3$ according to the direction in which the slide N is moved. The slide N is connected at opposite sides with a rope or cable P extending over suitable guide pulleys $P'$, arranged on the bed plate B and the frame $A^2$ so that the operator can take hold of the cable P at any point of its length to impart motion to the cable and thus shift the slide N in either direction to move the sprocket chain E in engagement with the sprocket wheel J or $K^3$. The friction rollers O, $O'$ are preferably journaled in a bearing $O^2$ held vertically adjustable on a slide N by a clamping bolt $O^3$ slidingly engaging a vertical slot $N^2$ in the slide N, as plainly indicated in Figs. 2, 5, 6 and 7.

It is understood that when the operator moves the cable P in the direction of the arrow $a'$ (see Fig. 2) then the friction rollers O, $O'$ on the slide N move the sprocket chain E in engagement with the sprocket wheel J so as to rotate the feed screw in one direction, and when the cable P is moved in the inverse direction of the arrow $a'$, then the friction rollers O, $O'$ move the sprocket chain E in engagement with the sprocket wheel $K^3$ to rotate the feed screw G in the opposite direction.

It is understood that by having the tightening pulley F yieldingly mounted, the sprocket chain E is sufficiently yielding to allow of shifting it bodily for engagement with either sprocket wheel J or $K^3$. By making the sprocket wheels J, K, $K^2$ and $K^3$ removable and the stud L and the arm $L'$ adjustable any desired sizes of sprocket wheels may be used to rotate the feed screw G with more or less speed according to the nature of the work in hand at the time.

The sprocket chain E is automatically moved out of engagement with the corresponding gear wheel J or K³ as soon as the spindle C reaches the end of its forward or backward stroke, and for this purpose the following arrangement is made: The extension H' of the feed nut H is adapted to engage tripping arms Q, Q' adjustably secured on a rock bar Q² by handled set screws Q³, as plainly indicated in Figs. 1 and 4, the rock bar Q² being mounted to rotate in suitable bearings arranged on the head stock B'. One end of the rock bar Q² is provided with an arm R connected by a link R' with an arm R² pulled by a spring R³ and attached to one end of a rock shaft S, extending transversely on the frame A², the rock shaft S forming a guideway for the upper end of the slide N. On the rock shaft S are arranged cam pins S' spaced apart and normally held by the action of the spring R³ out of engagement with a cam pin S² fixed on the slide N, so that the latter can be freely shifted by the use of the cable P at the time the tripping device is not used. When the tripping device, however, is used one of the pins S' engages the cam pin S² to hold the slide N in a locked position, and when the shaft S is rocked by the tripping device then the engaging cam pin S' moves out of engagement with the cam pin S² thus releasing the slide N. The chain E tends to straighten out by the action of the spring-pulled tightening pulley F so that the slide N is shifted by the chain E and the latter moves out of engagement with the sprocket wheel J or K³.

It is understood that when the spindle C reaches the end of its forward or backward stroke, the extension H' of the feed nut H engages the corresponding arm Q or Q' to impart a swinging motion to the said arm, and then the rock bar Q² which by the arm R, link R' and arm R² imparts a rocking motion to the rock shaft S, and the latter by the corresponding cam pin S' disengaging the pin S² releases the slide N and allows the same to shift for disengaging the sprocket chain E from the sprocket wheel J or the sprocket wheel K³. Thus as soon as the spindle C reaches the end of its forward or backward stroke the sprocket chain E is moved out of engagement with the sprocket wheel J or K³ and hence the rotation of the feed screw G ceases for the time being, and the operator taking hold of the cable P shifts the slide N in the proper direction to engage the sprocket chain E with the sprocket wheel K³ or J to rotate the feed screw G in the opposite direction thus reversing the sliding movement of the spindle C.

It is understood that the operator can operate the machine by the use of the cable P without using the automatic stop.

In using the machine, the feed screw G wears mainly on one side, and when it has worn to an undesirable extent then the feed screw G is removed and reversed so that the wear will now come on the other side of the feed screw.

By having the sprocket wheel I arranged in the manner described, it can be readily slipped onto either flattened end of the feed screw G and secured in place by the nuts I².

The sprocket wheel E' as well as the sprocket wheel D, may be made in sections to permit convenient removal of the body of either of these sprocket wheels for using a larger or a smaller sprocket wheel body in its place.

The operation is as follows: When the machine is to be used as a lathe, the cable P is shifted to shift the slide N to an intermediate non-active position, so that the sprocket chain E is out of engagement with the sprocket wheels J and K³, and when the shaft E² is rotated, a rotary motion is transmitted to the spindle C, the face plate and the work carried thereby to turn the work by a suitable tool held on a tool rest of any approved construction. If desired, the spindle C, the face plate and the work may also be moved axially by the aid of the feed screw G whenever it is desired to do so.

When it is desired to use the machine for boring purposes, the operator fastens a boring tool on the spindle C and sets the arms Q and Q' a distance apart, corresponding approximately to the depth to be bored in an article held on the bed plate B. The operator then shifts the cable P in the same direction of the arrow a' to move the sprocket chain E into driving engagement with the sprocket wheel J whereby the feed screw G is rotated to move the feed nut H forward thereby advancing the spindle C and causing the boring tool to bore the article held fixed on the bed plate B in any suitable manner.

When the extension H' of the nut H engages the arm Q it imparts a swinging motion to the arm Q and thereby rocks the rock bar Q², which by the arm R, link R' and arm R² rocks the shaft S, which latter by one of its pins S' releases the slide N and allows the latter to shift in the inverse direction of the arrow a' to move the sprocket chain E out of engagement with the sprocket wheel J, and hence the feed screw G is stopped and the forward movement of the spindle C ceases. The operator now shifts the cable P in the inverse direction of the arrow a' to engage the sprocket chain E with the sprocket wheel K³ whereby the feed screw G is turned in the reverse direction and the feed nut H is returned and with it the spindle C to disengage the boring tool from the article. When the extension H' of the feed nut H finally engages the arm Q' the rock bar Q² is rocked to cause the rocking of the rock shaft S whereby the slide N is shifted in the direction of the arrow $a'$ and the sprocket chain E is moved out of engagement with the sprocket wheel $K^3$. The feed screw G is then stopped and the return movement of the feed nut H and the spindle C ceases.

The spindle may also be used for cutting threads and a cut can be taken either when the spindle is traveling forward or when it is traveling backward, that is, it works both ways, it being only necessary to adjust the cutting tool and reverse it with the aid of the cable P.

It is understood that this combined boring machine and lathe may be made either right or left hand, the drawing and description disclosing a left-hand machine.

Having thus described my invention, I claim as new and desire to secure by Letters Patent:

1. A combined boring machine and lathe, comprising a spindle mounted to turn and to slide in the direction of its axis, a gearing for rotating said spindle, a feed screw arranged parallel with said spindle, a feed nut traveling on said feed screw and engaging said spindle to move the latter in the direction of its axis, a tripping device adapted to be engaged by the said feed nut at the end of the forward and backward stroke of the spindle, a driving gear for the said feed screw to rotate the latter in either direction, and means controllable by said tripping device for shifting said gearing out of engagement with said driving gear for said feed screw.

2. A combined boring machine and lathe, comprising a spindle mounted to turn and to slide in the direction of its axis, a chain drive for rotating the said spindle, a feed screw arranged parallel with the said spindle, a feed nut traveling on the said feed screw and engaging the said spindle to move the latter in the direction of its axis, a tripping device adapted to be engaged by the said feed nut at the end of the forward and backward stroke of the spindle, a driving gear for the said feed screw to rotate the latter in either direction, and means controlled by the said tripping device for moving the chain of the said chain drive out of engagement with the said driving gear for the feed screw.

3. A combined boring machine and lathe, comprising a spindle mounted to turn and to slide in the direction of its axis, a chain drive for rotating the said spindle, a feed screw arranged parallel with the said spindle, a feed nut traveling on the said feed screw and engaging the said spindle to move the latter in the direction of its axis, a tripping device adapted to be engaged by the said feed nut at the end of the forward and backward stroke of the spindle, a driving gear for the said feed screw to rotate the latter in either direction, the driving gear having sprocket wheels between which passes the chain of the said chain drive, and a manually-controlled slide engaging the chain of the said chain drive to move the chain in engagement with either sprocket wheel, the said tripping device actuating the said slide for moving the chain out of engagement with either sprocket wheel at the end of the stroke of the spindle.

4. A combined boring machine and lathe, comprising a spindle mounted to turn and to slide in the direction of its axis, a sprocket chain drive for turning the said spindle, a yieldingly mounted tightener for the sprocket chain of the said chain drive, a slide engaging the said sprocket chain, manually-controlled means for shifting the said slide, a feed screw parallel with the said spindle, a feed nut traveling on the said feed screw, a collar on the said spindle engaged by the said feed nut, and a driving gear for the said feed screw and having spaced sprocket wheels for rotating the feed screw in either direction, the said sprocket chain extending between the said sprocket wheels adjacent the said slide so that on manually shifting the slide the sprocket chain is moved into engagement with either sprocket wheel according to the direction in which the slide is shifted.

5. A combined boring machine and lathe, comprising a spindle mounted to turn and to slide in the direction of its axis, a sprocket chain drive for turning the said spindle, a yieldingly mounted tightener for the sprocket chain of the said chain drive, a slide engaging the said sprocket chain, manually-controlled means for shifting the said slide, a feed screw parallel with the said spindle, a feed nut traveling on the said feed screw, a collar on the said spindle engaged by the said feed nut, a driving nut for the said feed screw and having spaced sprocket wheels for rotating the feed screw in either direction, the said sprocket chain extending between the said sprocket wheels adjacent the said slide so that on manually shifting the slide the sprocket chain is moved into engagement with either sprocket wheel according to the direction in which the slide is shifted, a rock bar having adjustable arms adapted to be engaged by the said feed nut, a rock shaft, a connection between the rock bar and rock shaft, and a connection between the said rock shaft and the said slide for automatically releasing the latter to move the sprocket chain out of driving engagement with the corresponding sprocket wheel.

6. A combined boring machine and lathe, comprising a spindle mounted to turn and to slide in the direction of its axis, a sprocket chain drive for the said spindle, a yieldingly mounted tightener for the said sprocket chain of the said drive, a slide having friction rollers between which passes the said sprocket chain, a feed mechanism for moving the said spindle forward or backward in the direction of its axis, the feed mechanism having spaced sprocket wheels for engagement by the said sprocket chain, manually-controlled means for shifting the said slide to move the sprocket chain into engagement with either sprocket wheel, and automatic means controlled by the feed mechanism for disengaging the sprocket chain from either sprocket wheel at the time the spindle reaches the end of its forward or backward stroke.

7. A combined boring machine and lathe, comprising a spindle mounted to turn and to slide in the direction of its axis, a sprocket chain drive for turning the said spindle, a yieldingly mounted tightener for the sprocket chain of the said chain drive, a slide engaging the said sprocket chain, manually-controlled means for shifting the said slide, a feed screw parallel with the said spindle, a feed nut traveling on the said feed screw, a collar on the said spindle engaged by the said feed nut, a driving gear for the said feed screw and having spaced sprocket wheels for rotating the feed screw in either direction, the said sprocket chain extending between the said sprocket wheels adjacent the said slide so that on manually shifting the slide the sprocket chain is moved into engagement with either sprocket wheel according to the direction in which the slide is shifted, a rock bar having adjustable arms adapted to be engaged by the said feed nut, a rock shaft arranged in the direction of the travel of the said slide, the latter having a tooth, and the rock shaft having pins for engaging with the said tooth, to release the slide for moving the sprocket chain out of engagement with the corresponding sprocket wheel, and a connection between the said rock bar and the said rock shaft.

8. A combined boring machine and lathe, comprising a spindle mounted to turn and to slide in the direction of its axis, a sprocket chain drive for turning the said spindle, an adjustable guide pulley over which passes the sprocket chain of the said chain drive, a yieldingly mounted tightener for the sprocket chain of the said chain drive, a slide engaging the said sprocket chain, manually-controlled means for shifting the said slide, a feed screw parallel with the said spindle, a feed nut traveling on the said feed screw, a collar on the said spindle engaged by the said feed nut, and a driving gear for the said feed screw and having spaced sprocket wheels for rotating the feed screw in either direction, the said sprocket chain extending between the said sprocket wheels adjacent the said slide so that on manually shifting the slide the sprocket chain is moved into engagement with either sprocket wheel according to the direction in which the slide is shifted.

9. In a combined boring machine and lathe, a spindle mounted to turn and to slide in the direction of its axis, a sprocket chain drive for turning the said spindle, a slide engaging the said sprocket chain, manually-controlled means for shifting the said slide, a feed screw parallel with the said spindle, a feed nut traveling on the said feed screw, a collar on the said spindle engaged by the said feed nut, and a driving gear for the said feed screw and having spaced sprocket wheels for rotating the feed screw in either direction, the said sprocket chain extending between the said sprocket wheels adjacent the said slide so that on manually shifting the slide the sprocket chain is moved into engagement with either sprocket wheel according to the direction in which the slide is shifted.

10. A combined boring machine and lathe provided with a reversible removable feed screw having both ends flattened, and a sprocket wheel having a bore fitting either end of the said feed screw.

11. A combined boring machine and lathe, comprising a spindle mounted to turn and to slide in the direction of its axis, a sprocket chain drive for turning the said spindle, a yieldingly mounted tightener for the sprocket chain of the said chain drive, and having a pivoted adjustable arm carrying a pulley at its free end for engagement by the said sprocket chain, a rope connected with the arm, a guide pulley over which passes the rope and a spring connected with the said rope, a slide engaging the said sprocket chain, manually-controlled means for shifting the said slide, a feed screw parallel with the said spindle, a feed nut traveling on the said feed screw, a collar on the said spindle engaged by the said feed nut, and a driving gear for the said feed screw and having spaced sprocket wheels for rotating the feed screw in either direction, the said sprocket chain extending between the said sprocket wheels adjacent the said slide so that on manually shifting the slide the sprocket chain is moved into engagement with either sprocket wheel according to the direction in which the slide is shifted.

In testimony whereof I have signed my name to this specification in the presence of two subscribing witnesses.

HERBERT JAMES WYATT.

Witnesses:
W. MAJOR UPCRAFT,
J. S. ELLSWORTH.